HENRY JONES

Cocks.

No. 123,996 — Patented Feb. 27, 1872.

Witnesses:
Chas. H. Smith
Geo. D. Walker

Inventor,
Henry Jones
per L. W. Serrell
Atty

UNITED STATES PATENT OFFICE.

HENRY JONES, OF PHILADELPHIA, PENNSYLVANIA, ASSIGNOR TO HIMSELF, JAMES JONES, AND CHARLES HARRISON.

IMPROVEMENT IN COCKS.

Specification forming part of Letters Patent No. 123,996, dated February 27, 1872.

*To all whom it may concern:*

Be it known that I, HENRY JONES, of the city of Philadelphia, in the State of Pennsylvania, have invented an Improvement in Cocks for Fluids; and I do hereby declare the following to be a full, clear, and exact description of the said invention, reference being had to the annexed drawing making part of this specification, wherein—

Figure 1:
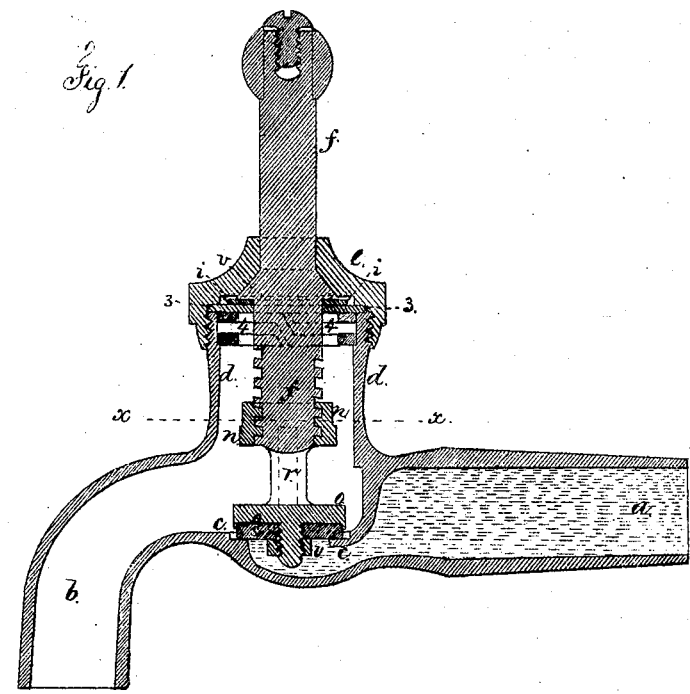
Figure 2:
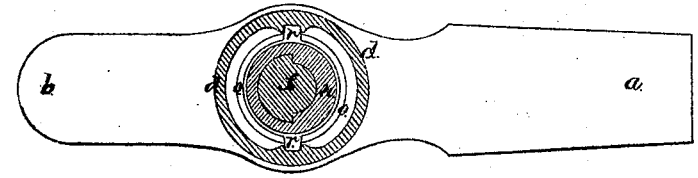

Figure 1 is a vertical longitudinal section of the said cock, and Fig. 2 is a sectional plan at the line $x\ x$.

In the cocks for water and other fluids in which a valve is pressed upon the seat by a screw, difficulty has arisen in keeping the stem of the screw tight at the point where it passes through the screw-cap, because the conical collar before applied upon the stem wears and becomes loose. The face of the valve is also difficult to keep in good condition, especially when the cock is for hot water, because the heat injures both rubber and leather, and a metal face is frequently injured by hard substances getting between the valve and its seat. My invention relates to a washer applied in a recess in the cap of the cock, in combination with the conical collar of the valve-stem, and a spring and diaphragm that act to keep the said conical collar tight against the cap. I also make use of a wooden disk for the surface of the valve, the same being let into a recess; and I find, by practical use, that the wood is uninjured by hot water, and remains tight for a longer time than any of the materials heretofore employed, and is very cheap and easily replaced.

In the drawing, $a$ is the inlet-pipe of the cock; $b$, the delivery-pipe or bit; $c$ is the seat; and $d$ the cylinder, with the screw-cap $e$, through which the valve-stem $f$ passes. These parts are of usual size and construction. The valve-stem $f$ has an elongated conical collar, 2, seated in a conical recess in the cap $e$, but extending below the lower edge of its seat. $i$ is a metal washer or bearing-plate between the flat side of the collar 2 and the rubber or leather diaphragm 3, which diaphragm is clamped at its edges between $d$ and $e$. The washer $i$ sets within a recess in the cap $e$, and below the diaphragm 3 is a spring, 4, resting at its edges upon offsets or shoulders within the cylinder $d$. This spring keeps the washer $i$ against the conical collar 2, and presses that collar into its countersunk seat, so as to keep the parts water-tight. The washer $i$ prevents friction or wear upon the diaphragm 3, and the spring 4 follows up the parts as they wear, keeping them always properly in contact, but allowing the stem $f$ to turn freely. The lower end of the stem $f$ is made as a screw, passing into the nut $n$ that is connected to the valve $o$ by the bars $r$ that slide in grooves within the cylinder $d$; and $s$ is a disk, of wood, set into a recess in the surface of the valve, and secured by a screw-nut, $v$.

This wooden valve surface is tight when screwed to place, as it is partially elastic, and is very durable even under the action of hot water.

I claim—

The combination, in a compression-faucet, of a spiral spring, elastic washer, bearing-plate, elongated conical stem-collar, and recessed cap, all constructed and arranged substantially as described, and for the purpose set forth.

In witness whereof I have hereunto set my signature this 11th day of November, A. D. 1869.

HENRY JONES.

Witnesses:
CHAS. H. SMITH,
GEO. T. PINCKNEY.